UNITED STATES PATENT OFFICE.

MARC LAFFONT, OF PARIS, FRANCE.

ARTIFICIAL STONE.

SPECIFICATION forming part of Letters Patent No. 501,794, dated July 18, 1893.

Application filed April 13, 1892. Serial No. 429,067. (No specimens.) Patented in France November 28, 1891, No. 217,727; in England June 2, 1892, No. 10,532, and in Canada June 14, 1892; No. 39,148.

*To all whom it may concern:*

Be it known that I, MARC LAFFONT, a citizen of the Republic of France, residing at Paris, in said Republic, have invented an Artificial Stone and Process for the Manufacture of the Same, of which the following is a full, clear, and exact description, and for which Letters Patent have been obtained as follows: in France, No. 217,727, dated November 28, 1891; in Canada, No. 39,148, dated June 14, 1892, and in Great Britain, No. 10,532, dated June 2, 1892.

The object of the present invention is to produce for building and paving purposes and other industrial and artistic uses, an artificial rock possessing all the desirable properties of the natural igneous or eruptive rock, it being conceded that these so called eruptive or igneous rocks constitute a building material of the highest character. Their extreme hardness, however, and the difficulty of cutting or shaping them to the form desired, create an insuperable obstacle to their economic use for such purpose. Heretofore attempts have been made by laboratory processes (*i. e.*, by chemical methods, or by melting, at a heat of from 1,050° to 1,600° centigrade, the more fusible elements of igneous rocks) to produce a material somewhat similar to these natural formations. In these experiments refractory materials have never been employed. Their results have not been commercially available, and the products differed from that obtained by means of my present invention. Obviously the great expense attending such processes forbids their employment for the production of building materials for industrial use.

From the study of mineralogy and geological formations, it is ascertained that certain clays or argils contain the elements of igneous rocks, and are in fact formed of igneous rocks (or of sedimentary rocks) decomposed or altered by natural meteorological influences. These clays or argils therefore, contain elements essential to the composition of igneous or eruptive rocks. They are known as "fusible" clays or argils to distinguish them from refractory (apyrous) argils, and contain, iron oxide (three to ten per cent. or more) lime (about three to ten per cent.) alkalies, magnesia, and sometimes manganese, &c. Moreover, sedimentary rocks (also known in geology as "aqueous" rocks to distinguish from igneous rocks) being the result or erosion of igneous or eruptive rocks, contain also the elements available for the production of artificial rocks for the purposes hereinbefore specified.

My invention consists in the manner in which I combine the elements of the igneous or eruptive rocks and produce synthetically by the application of a definite degree of heat to the combined elements, a new composition of matter or product; and also in the composition of matter thus obtained. To distinguish the new product I have given it the arbitrary name of "pyrosilex" by which it is now known.

In preparing the compound, (which is a binary mixture) for the manufacture of the new product, I employ always as one element a refractory or apyrous clay or argil, but soft and plastic. The refractory or apyrous argil should contain as little as possible of foreign substances, such as alkalies, lime, magnesia, or iron oxides. For the other element I may employ one of either of the following classes:—first, fusible argils, previously calcined; second, igneous or eruptive rocks or the dust or débris thereof; third, aqueons or sedimentary rocks or the dust or débris thereof. As has already been pointed out these three geological classes contain each certain essential elements found in igneous or eruptive rocks, that is to say the fusible elements. Inasmuch, however, as the three classes or groups of material differ one from the other in certain respects, I confine this present application to the composition obtained by combining refractory plastic argil with fusible argil, reserving to separate applications the compositions of (first) refractory argil and igneous rocks, and (second) refractory argil and sedimentary rocks. The process, however, or mode of procedure is substantially the same whatever material be selected, and therefore it is my intention to cover herein the process broadly, whether the fusible element be used in the form of fusible argils, or of the dust of sedimentary rocks, or of the dust of igneous rocks.

The following is a description in detail of the best mode known to me of carrying the invention into effect: The plastic apyrous argil, previously dried, is pulverized and sifted. The calcined fusible argil (such as the bricks or waste from brick yards) is converted into a friable condition and likewise pulverized. When the dust or débris of igneous or of sedimentary rocks is employed as the fusible ingredient, calcination is not necessary. The two pulverulent ingredients are then mixed in the dry state, in proportions which are variable according to the nature of the particular material, but with a minimum of fifteen per cent. of the plastic refractory ingredient. The mixing being thoroughly performed, the mass is either compressed into the desired form in a dry state, or is converted into a paste by adding sufficient water, and kneaded or worked to render it uniform and homogeneous. It is desirable to subject the mass to successive malaxations, as thereby its plasticity is thoroughly developed. After malaxation the plastic mass may be molded, pressed, or otherwise shaped to the desired form.

By varying the composition of different parts of the mass it is possible to obtain variegated, streaked, veined or particolored effects in the finished product; or pieces of quartz, flint and other infusible substances may, for special objects, be incorporated or embedded in the surface of the mass during or after the last molding.

The final molding or shaping is preferably accomplished with the aid of a hydraulic or other press, and at a time when the moisture is so far dried out that the mass has become stiff.

The chemical or molecular change which converts the binary mixture into the definite product to which the generic name of pyrosilex has been given, occurs at a temperature of 1,250° centigrade, or over; but in raising the mass to that temperature, certain precautions are to be observed to produce the best results. The pieces, previously dried as far as possible, are placed in a suitable furnace lined with refractory material and capable of withstanding the high temperature employed, and subjected to a slow fire for twelve hours, more or less, to insure complete desiccation. The fire may be increased progressively during this period so as to reach at the end thereof a temperature of about 525° centigrade. From this time begins the intense firing, which should be increased progressively so as to reach a temperature of 1,250° centigrade (the melting point of pure gold) at the end of about the thirtieth hour from the time of beginning the slow fire. During the intense firing, the product undergoes changes of color as follows: At 700° deep red, at 800° cherry red, at 900° bright cherry, at 1,000° light cherry, at 1,050° very dark orange, at 1,100° dark orange, at 1,200° light orange, at 1,250° lighter orange, at 1,300° almost white, at 1,400° dazzling white. The last named temperature, at which the hardness of the resultant product and its crystalline structure become perfect, may be maintained and even increased until the thirty-sixth hour. After the maximum heat has been applied, the fires are lowered, and the furnace regulated in the manner usually followed to produce a very gradual and even cooling, lasting about three days, and making the period for a complete operation about from five to eight days.

The foregoing indications for firing are intended to guide the operation, and not to control; and of course the invention is not limited to the precise mode of procedure that may be followed.

Observations made from test pieces withdrawn at different stages during the firing show the transformation that occurs at the critical point (1,250° or thereabout). If the heat has been carried to 1,100°, and maintained at that point for forty-eight hours the product presents only the appearance and properties of ordinary brick of good quality. In another firing, the heat having been raised to 1,200°, the products had the consistency and appearance of excellent Burgundy bricks of the best quality, but still showed the character of bricks, which result simply from a change in the physical state of the matter from a plastic or colloid condition to a substance more or less hard according to the degree of heat. Pyrosilex, on the other hand, is the result of a chemical change, or combination approaching in its nature a chemical change, occurring at a temperature above 1,250° centigrade. It is further observed, in pushing the firing beyond this limit, that after passing 1,250° centigrade, the crystallogenic forces act from the interior to the exterior, the central part being visibly porphyritic and glossy, non-scratchable and non-adherent to the tongue, while the surface still retains the appearance and consistency of brick; whereas, up to 1,200°, the change of state (which occurs in the manufacture of ceramic products) proceeds from the exterior to the interior, the latter presenting the zone of least resistance. When the product has been finally obtained, the operations being properly conducted according to the indications given above, it is generally no longer alterable by any further elevation of temperature, depending upon the fusibility of the clays or other materials used.

A distinguishing characteristic of the products is its extremely refractory nature, being infusible at a temperature which fuses hard porcelain. Its specific gravity is between 2.2° and 2.6° and its hardness about from 7 to 8 (Moh's scale). It has a crystalline aspect, sharp and regular fracture, and in its perfect condition is covered by a sort of natural enamel, of bronze-like appearance.

The change occurring at the temperature indicated (above 1,250°) may be described as a chemical synthesis. The plastic apyrous clay having (during the preparation of the mixture) enveloped every particle or molecule of the calcined common clay (or other fusible ingredient) and having lost its plasticity, forms around the fusible particle, while at the same time uniting therewith, a microscopic envelope. The product is not only not vitrified, but in fact is crystalline, the fracture presenting under the magnifying glass a confused mass of crystals resembling granite rocks, porphyries, trachytes or basalts, according to the predominance of the fusible element.

When the operation is perfectly carried out the surface of the product is not absorbent of liquids, cannot be scratched by a steel point, and is not affected by strong boiling acids.

Having now particularly described my invention and the manner of producing the same, what I claim as new is—

1. The herein described process for the production of artificial stone, which process consists in mixing plastic refractory argil with the fusible matter derived from igneous rocks, the mixture containing a minimum of fifteen per cent. of the plastic ingredient, and heating the mixture to a temperature above 1,250° centigrade maintaining the heat above that point until the material is transformed into a homogeneous crystalline body, substantially as described.

2. The herein described process for the production of artificial stone, consisting in calcining and pulverizing fusible argil, mixing the same with pulverized plastic refractory argil, the mixture containing a minimum of fifteen per cent. of the plastic ingredient, and heating to a temperature above 1,250° centigrade, substantially as set forth.

3. A homogeneous crystalline body, composed of plastic refractory argil and fusible calcined argil, having the properties and appearance herein set forth.

In testimony whereof I have signed this specification in the presence of two subscribing witnesses.

MARC LAFFONT.

Witnesses:
ROBT. M. HOOPER,
JOSEPH TOURNIER.